(12) United States Patent
Nagashima

(10) Patent No.: US 6,404,419 B1
(45) Date of Patent: Jun. 11, 2002

(54) IMAGE PROCESSING DEVICE

(75) Inventor: Hiroshi Nagashima, Wakayama (JP)

(73) Assignee: Shima Seiki Manufacturing Ltd., Wakayama (JP)

( * ) Notice: Subject to any disclaimer, the term of this patent is extended or adjusted under 35 U.S.C. 154(b) by 0 days.

(21) Appl. No.: 09/161,305

(22) Filed: Sep. 28, 1998

(30) Foreign Application Priority Data

Sep. 26, 1997 (JP) ................................................ 9-279596

(51) Int. Cl.[7] .............................. G09G 5/08; G09G 5/37; G06T 11/80
(52) U.S. Cl. ..................... 345/173; 345/179; 345/581; 345/649
(58) Field of Search ............................ 345/179, 429, 345/443, 173, 581

(56) References Cited

U.S. PATENT DOCUMENTS

| | | | | |
|---|---|---|---|---|
| 5,182,548 A | * | 1/1993 | Haeberli ..................... | 340/706 |
| 5,289,566 A | * | 2/1994 | Walker et al. ............... | 395/132 |
| 5,408,593 A | | 4/1995 | Kotaki et al. ................ | 395/122 |
| 5,596,692 A | | 1/1997 | Martin et al. ................ | 395/143 |
| 5,611,036 A | | 3/1997 | Berend et al. ............... | 395/141 |
| 6,067,073 A | * | 5/2000 | Rae-Smith et al. .......... | 345/147 |

FOREIGN PATENT DOCUMENTS

| | | |
|---|---|---|
| EP | 0 403 054 | 12/1990 |
| GB | 2157122 | 10/1985 |
| WO | 92/18938 | 10/1992 |

OTHER PUBLICATIONS

T. Bleser, J. Sibert, and J McGee, "Charcoal Sketching: Returning Control to the Artist," ACM Transactions on Graphics, vol. 7, No. 1, Jan. 1988, pp. 76–81.*
ArtGem Manual, RL Vision, online at www.rivision.com/artgem/manual/usage.html.*
Haeberli, "Paint by Numbers: Abstract Image Representations" Computer Graphics, Aug. 6, 1990, pp. 207–214.
Lewis, "Texture synthesis for digital painting", SIGGRAPH '84 Conference Proceedings, Jul. 23–27, 1984, vol. 18, No. 3, pp. 245–252.

* cited by examiner

*Primary Examiner*—Steven Saras
*Assistant Examiner*—William C. Spencer
(74) *Attorney, Agent, or Firm*—Arent Fox Kintner Plotkin & Kahn, PLLC

(57) ABSTRACT

Two-dimensional pen tables with texture for a low pressure, a medium pressure and a high pressure are provided for each pen. According to the pen pressure, pen tables are interpolated to generate drawing data for one patch. The image data in the stroke and the drawing data of an unprocessed patch are mixed together to generate new image data. This processing is repeated till the completion of the processing of the stroke. Next, the data of the image memory and the data of the stroke are made to modify the data in the image memory.

5 Claims, 7 Drawing Sheets

IMAGE PROCESSING DEVICE

FIELD OF THE INVENTION

The present invention relates to an image processing device, in particular, an image processing device offering better expression with usage of pressure to a drawing input means thereof.

PRIOR ART

In an image processing device, an image to be processed is stored in a memory such as a frame memory and displayed on a monitor, and an input location on the image is specified using a drawing input means such as a combination of a stylus and a tablet. A processing area simulating a single touch of a stylus, etc. is called a patch, and various forms of patches, corresponding to a variety of drawing tools such as a pencil, chalk, hair pencil and brush, are stored. The information is stored, for example, in the form of tables, and values stored are, for example, densities of an input image. A user selects one table from these tables by selecting one kind of tool from a group of virtual drawing tools, and specifies an input location with the drawing input means. In this way, an image stored in the image memory is modified to execute image processing.

Pressure to a stylus, etc. (hereinafter may be called "stylus pressure") represents the magnitude of an input. It has been known that a stylus density distribution under the maximum pressure (maximum stylus pressure) is stored in a table and the stylus pressure is reflected in the density distribution by multiplying the values stored in the table by the stylus pressure. In this technique, a density distribution of the maximum stylus density at the maximum stylus pressure is stored, and the stylus density drops in proportion to a drop in the stylus pressure. When the pressure to a real pen decreases, the stroke width, the form of the pen, and the texture and the like of the pen will change. In this technique, however, processing is limited to lowering the stylus density in proportion to the stylus density distribution at the maximum pressure.

It has been also known that the size of a patch is changed in proportion to the stylus pressure to reflect the stylus pressure in the stroke width of an input image (Japanese Unexamined Patent Hei3-41572, corresponding to U.S. Pat. No. 5,408,593). It, however, is difficult to execute changing the patch size in proportion to the stylus pressure with a table. In this piece of prior art, the patch size is determined by calculation from the stylus pressure value without use of any tables.

The drawing input means, however, imitates various drawing tools ranging from brush, pencil, to chalk, and in the case of these real drawing tools, as the stylus pressure changes, both the input density and the stroke width change. In the prior art, the effect of the stylus pressure is limited to either stroke width or density. In the case of real drawing tools, as the stylus pressure changes, the texture in the patch also changes. However, no technique is known that changes the texture according to the stylus pressure.

SUMMARY OF THE INVENTION

A primary object of the present invention is to offer better expression on an image processing device with the pressure exerted to a drawing input means, and a secondary object is to virtually provide users with varied drawing tools that may execute high-speed processing.

Another object of the present invention is to provide a specific configuration for executing the above-mentioned invention at a high speed.

Another object of the present invention is to enable high speed inputting for an image having a high spatial resolution and a better expression.

Another object of the present invention is to make the texture in a patch variable with the pressure and to express this texture even for a curved stroke.

The present invention provides an image processing device having a memory for storing an image, a monitor for displaying said stored image, a drawing input means for inputting an input location and pressure applied, and a table storing an input signal distribution for a single touch of said drawing input means for each of kinds of virtual pens, said image processing device characterized in that plural tables are provided for each of said pens and that said distribution is generated for said pressure by interpolating these tables. A drawing input means may be, for example, a combination of a stylus and a tablet. Any drawing input means will do, provided that it may specify the location of input on an image displayed on the monitor and the pressure, such as stylus pressure exerted to the stylus. A type of pen to be used is specified through, for example, a menu, and for each pen, are stored plural tables indicating an input signal distribution.

Preferably, at least two tables, one for a high pressure and one for a medium pressure, are provided for each of said pens, and at least a table for a low pressure is provided. They are arranged in such a way that, if said pressure is equal to or higher than the medium pressure, said distribution is determined by linear interpolation of the high pressure table and the medium pressure table, and if said pressure is equal to or lower than the medium pressure, said distribution is determined by linear interpolation of the medium pressure table and the low pressure table. A low pressure table corresponds to drawing input at, for example, the lowest pressure, and a single low pressure table may be used commonly for various pens.

Preferably, the resolution of said input location and the resolution of at least some of tables are arranged to be higher than the resolution of said stored image, and the read-out addresses of tables are arranged to be determined according to a surplus (sub-pixel address) of the resolution of the input location over the resolution of the stored image. For this purpose, the tables may be divided into plural ones in advance, and in this case, the sub-pixel address is used to select one to be read out. Instead of dividing tables according to sub-pixel address, data at addresses at intervals may be read out from the tables.

Preferably, each of said tables is a two-dimensional table, and is provided a means for reading out data after rotating the table according to the direction of travel of the drawing input. As a two-dimensional table is used, the texture in a patch may be expressed, and if the texture is changed according to the pressure, changes in texture with the stylus pressure may be expressed. Even when the texture has a directionality, the table may be effectively rotated according to the direction of travel of said input, for example, the direction of motion of the stylus, then the data or distribution of input signals may be read out. As for the rotation of the table, data may be read out after rotating the table, or for making rotational processing such as sub-pixel processing simpler, data after read-out may be rotated.

Preferably, a distribution of input signals with a texture is stored in at least a portion of each table.

Preferably, for each of at least some of pens, a low pressure table and a medium pressure table are provided, each storing an input signal distribution having plural peaks and a texture, and at least some of said plural peaks of said low pressure table and at least some of said plural peaks of said medium pressure table are arranged to be continuous in their locations in the tables. Here being continuous in peak locations means that locations of peaks are the same between the low pressure table and the medium pressure table or peak locations of the low pressure table are close to the peaks of the medium pressure table, for example, within the half width of the peak from the peak location. Preferably, in particular, on the low pressure table, an area in which input signals are virtually zero is provided between peaks.

In the present invention, for each kind of virtual pen provided for a user, plural tables corresponding to various pressures (stylus pressures) are provided, and they are interpolated. If the strength of input signals such as patch size or density distribution in a patch is varied from table to table, both the stroke width and the input density may be freely altered according to the pressure. As a result, expression in relation to the stylus pressure is enhanced, and varied virtual pens may be provided. Processing of tables is interpolation of linear or other types and may be done at a high speed by, for example, product sum operation.

Preferably, for medium and higher pressures at which influence of the pen kind is more conspicuous, a medium pressure table and a high pressure table are provided. For lower pressures at which influence of an input of any pen is small, a single table may be used irrespective of pen kinds, however, preferably, a low pressure table is provided for each pen. Then, according to the stylus pressure, linear interpolation is made between these tables. The number of tables required for each pen is two at the lowest and normally several. Thus, many kinds of pens may be provided with a relatively small number of tables. Moreover, processing of tables is linear interpolation and may be done at a high speed.

Preferably, read-out addresses of the tables are modified according to a sub-pixel address, and this allows more precise expression.

Preferably, texture in a patch is expressed by two-dimensional tables, and plural tables are interpolated according to the pressure. In this way, changes in texture with the stylus pressure may be expressed. Furthermore, as tables may be effectively rotated according to the direction of motion of the stylus, etc., the texture will be rotated as well, and if the direction of the stylus, etc. is bent, the direction of the texture will be bent; thus, enhanced expression for texture is achieved.

In particular, if distributions of input signals having plural peaks and texture are stored in two tables for a low pressure and a medium pressure, and at least some of peaks of one table is made continuous to that of the other table, a characteristic expression such as scratch may be made.

EMBODIMENT

Figure 1:
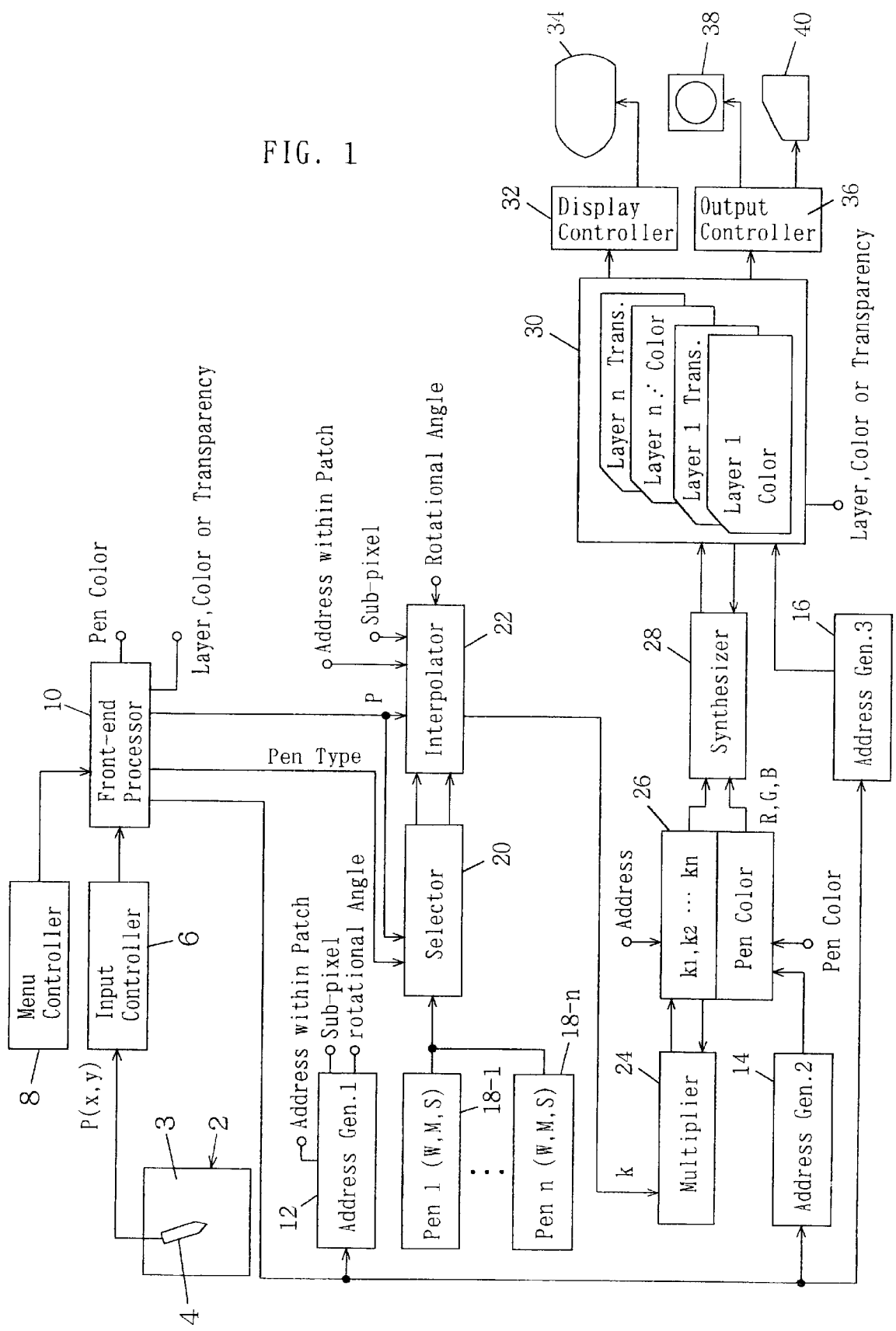
FIG. 1 is a block diagram of an image processor of an embodiment.

An embodiment is shown in FIG. 1 through FIG. 11. The configuration of an image processing device is shown in FIG. 1. 2 denotes a drawing input means being, for example, a combination of a tablet 3 and a stylus 4. Any drawing input means will do, provided that it can specify an input location on an image and a pressure applied to it. The resolution of the drawing input means 2 is higher than those of a monitor 34 and an image stored in an image memory 30, which will be described later. The surplus of the resolution of the input location specified through the drawing input means 2 than the resolution of the stored image is called sub-pixel part, and an address specified by the sub-pixel part is called sub-pixel address. 6 denotes an input controller that processes an input from the drawing input means 2 and inputs the processed input into a front-end processor 10. 8 denotes a menu controller that allows a user to specify a kind of image processing and a kind of virtual, or notional drawing tool (hereinafter referred to as a "pen") to be used.

The front-end processor is one for image processing and controls the respective parts of the image processing device. 12, 14 and 16 denote address generators. 18-1~18-n denote pen tables. Here these tables correspond to n types of pens. Each pen is provided with three pen tables, a pen table for a high pressure such as the highest pressure (subscript is S), a pen table for a medium pressure (subscript is M) and a pen table for a low pressure such as the lowest pressure (subscript is W). 20 denotes a selector that selects only necessary tables according to the type of pen specified by the front-end processor 10. 22 denotes an interpolator that selects two tables out of three tables that are relevant to the pen specified and makes linear interpolation. For example, the complement of the stylus density of drawing by the pen is denoted by k, and k is equal to or greater than zero and is equal to or less than 1. The purpose of drawing with a virtual pen or drawing with the drawing input means 2, etc. is to specify, for every patch, a distribution of k, a pen color and a patch location.

The distribution data of k of a pen table for a high pressure is denoted by ks, that of a pen table for a medium pressure by km, and that of a pen table for a low pressure by kw, respectively. The highest pressure is Ps, the pressure corresponding to the pen table for a medium pressure is Pm, and the lowest pressure is Pw, respectively. Then, when the pressure P is equal to or greater than Pm, the output of the interpolator 22 is given by $$k = ks \cdot (P-Pm) + km \cdot (Ps-P) \tag{1}$$

and when the pressure is less than Pm, the output is given by $$k = kw \cdot (Pm-P) + km \cdot (P-Pw) \tag{2}$$

The pressure P is normalized so that (Ps−Pm) and (Pm−Pw)=1. Calculations of the equations (1), (2) are done at high speed by product sum operation. The address generator 12 inputs the address within the patch into the interpolator 22, and specifies the sub-pixel address to execute the sub-pixel processing. The interpolator 22 processes rotational transformation, etc. It rotates pen tables according to the direction of the stylus 4. The rotational matrix is given by (3)

$$\begin{vmatrix} \cos\theta & -\sin\theta \\ \sin\theta & \cos\theta \end{vmatrix} \quad (3)$$

The pen tables 18-1 through 18-n are rotated by a difference θ between the direction of travel of the stylus 4 and the horizontal direction. Then values are read out of the tables.

24 denotes a multiplier. 26 denotes a pen layer memory that stores a pen color, for example, R, G and B values, H, S and V values, transparency, etc. This corresponds to storing, for example, a single stroke or an input image till the modification of the monitor image, which will be described later. k1·k2· . . . · kn is the product of complements of stylus densities of the pen in the order of patch 1, patch 2, . . . , patch n. For example, if the complement of a newly inputted stylus density is kn+1, the above-mentioned product will be multiplied by kn+1, and k1·k2· . . . ·kn·kn+1 will be written in the pen layer memory 26. The above-mentioned processing is done for each pixel, and only pixels that are common to those of the present patch are the subjects of the multiplication. For this purpose, the address generator 14 is used.

28 denotes a synthesizer that determines a new color, etc. and a new transparency of a layer specified on the image stored in the image memory 30 by synthesizing the original values of the layer and input values from the pen layer. For example, suppose the layer specified is in the R, G, B format in a color image, and color values of pixels of each component are R1, G1 and B1 and the transparency of each pixel is T1. Similarly, suppose the color values for each pixel of the pen layer are R2, G2 and B2, and the transparency of each pixel is T2. Now, the complement of stylus density of the pen layer (the above-mentioned k1·k2· . . . ·kn) is equal to the transparency T2.

The new transparency T of said layer after synthesis is given by $$T = T1 \cdot T2 \quad (4)$$

and decreases with drawing. A synthetic image that can be seen by placing the pen layer over said layer and viewing them from the viewpoint is equal to the image of the layer after the synthesis. From this, we get an equation (5)

$$R(1-T) = R1(1-T1) \cdot T2 + R2(1-T2) \quad (5)$$

where R is the red component of the color values of said layer after the synthesis. Components of blue and green are treated similarly. T is equal to the product of T1 and T2. If we put $$K = 1 - (1-T2)/(1-T) \quad (6)$$

then we get $$R = R1 \cdot K + (1-K)R2 \quad (7)$$

As T1 and T2 are determined, K will be determined. When this is used to make linear interpolation of R1 and R2, a new color value of said layer will be determined. When this processing is done for every pixel and for the respective components R, G and B, drawing of the layer can be done.

As the background layer, being the bottom layer, has no layer below it, the transparency T1 thereof can be set at zero. This is equivalent to substituting K of the equation (7) with T2.

As for the image memory 30, a frame memory or any appropriate memory may be used. As an image is handled as a stack of plural layers, modification and synthesis can be done with ease. Suppose the top layer is the first layer and the values of R of the respective layers are R11~R1n and the values of transparency are T11~T1n. Then the contribution L1 of the first layer to the final image is given by $$L1 = (1-T11) \cdot R11 \quad (8)$$

and the contribution Ln of the nth layer is given by $$Ln = T11 \cdot T12 \cdot \ldots \cdot T1n-1 \cdot (1-T1n) \cdot R1n \quad (9)$$

Components of G and B are treated in a similar manner. 16 denotes an address generator to the image memory 30. A display controller 32 is connected to the memory 30, and the display controller 32 gives adequate reduction/enlargement and offsetting, and displays the image of a specified layer and its transparency on the monitor 34. The user inputs data with reference to the location displayed by a cursor, etc. on the monitor image. 36 denotes an output controller that gives output to, for example, a disk 38 and a printer 40.

Figure 2:
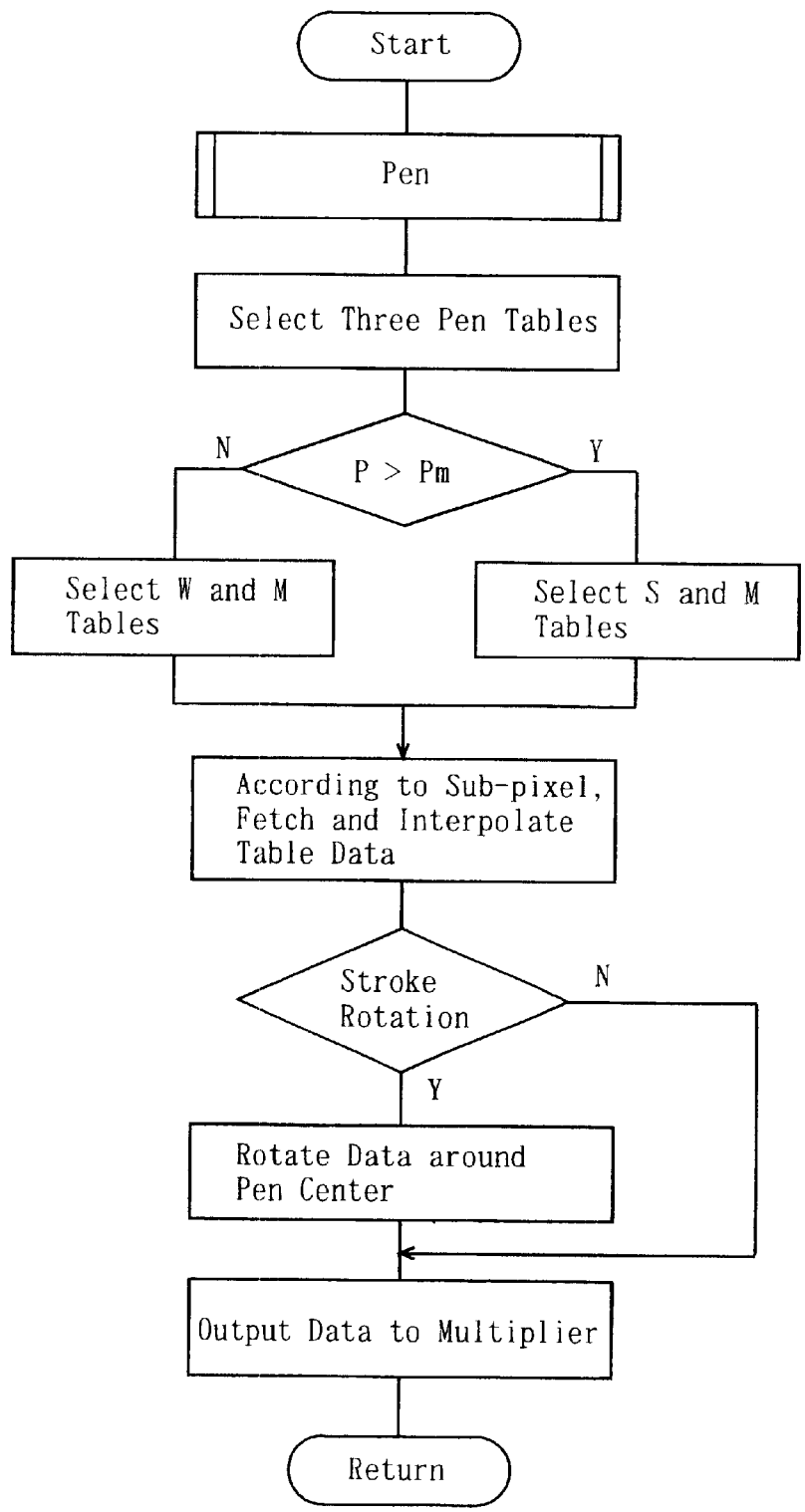
FIG. 2 is a flow-chart showing an algorithm for determining a pen output for a single patch.

In FIG. 2, is shown an algorithm for the output of a virtual pen, as k, to the multiplier 24, a PEN subroutine. A location on the monitor image is effectively specified by the stylus 4. This presupposes that the pen type has been designated. Three pen tables s, m and w are selected according to this designation. Two tables will be selected depending on whether the stylus pressure is equal to or greater than the medium pressure Pm or equal to or less than the medium pressure Pm. The sub-pixel address is considered to determine the read-out locations from the tables.

Figure 3:
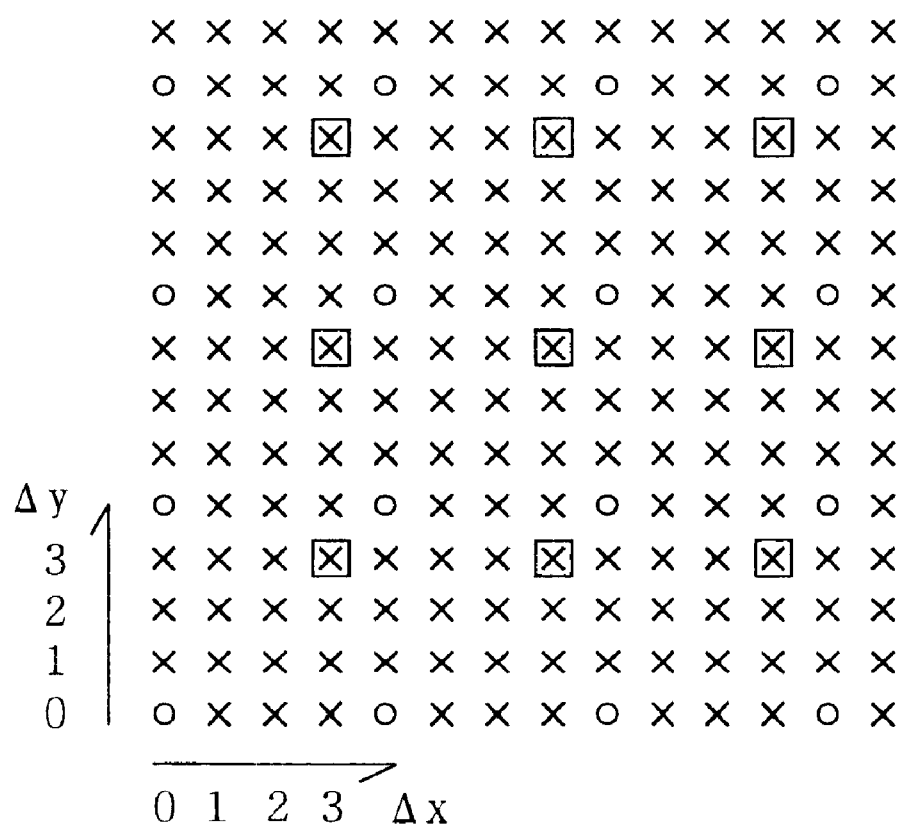
FIG. 3 is a diagram showing an example of a pen table corresponding to sub-pixels used in the embodiment.

For example, a pen table is shown in FIG. 3. A mark ○ in the diagram indicates a read-out location when the sub-pixel address (Δx, Δy) is (0, 0), and a mark × indicates a read-out location when the sub-pixel address is not (0, 0). In the diagram, the sub-pixel resolution is 2×2. This value, however, is arbitrary, and any value will do, provided it is equal to or greater than 2. Now, for example, if the sub-pixel address is (3, 3), data marked by □ in FIG. 3 will be read out. This process is done by generating addresses by the address generator 12 at regular intervals of three units, and each address thus generated should be a multiple of 4 +3.

Figure 4:
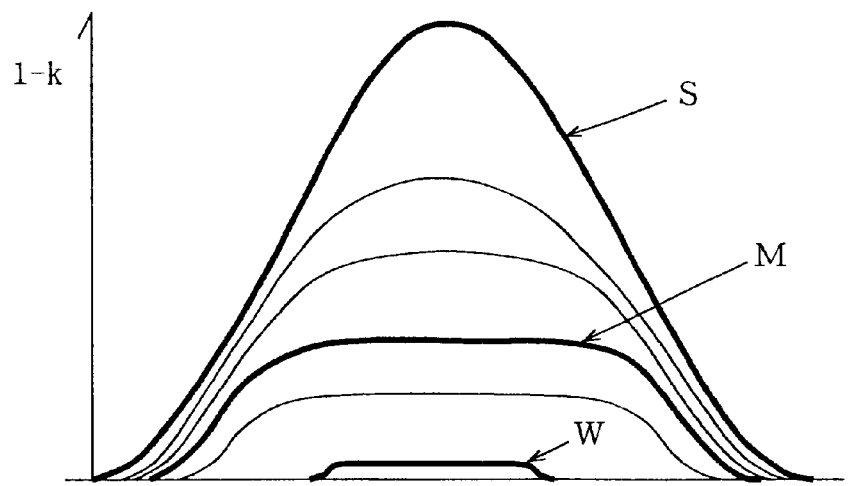
FIG. 4 is a diagram showing an example of a one-dimensional pen table used in the embodiment.
Figure 5:
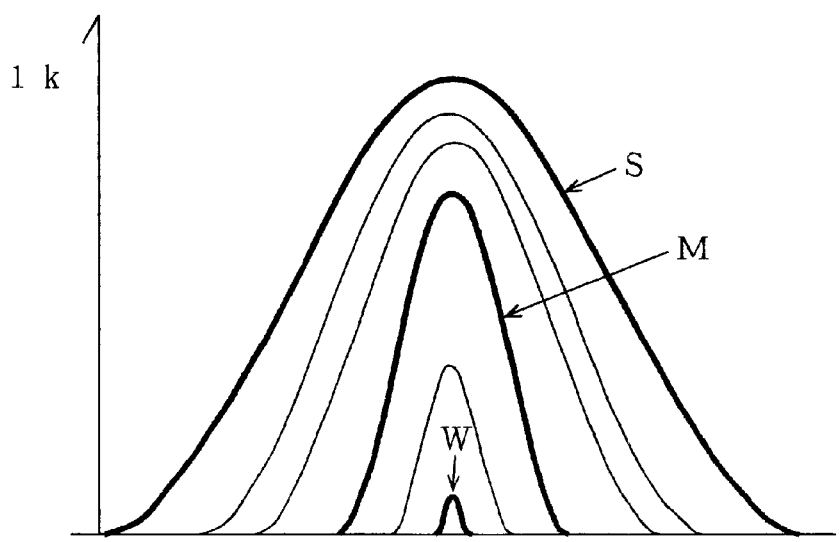
FIG. 5 is a diagram showing an example of a one-dimensional pen table used in the embodiment.

Examples of pen tables are shown in FIG. 4 through FIG. 8. Pens of FIG. 4 and FIG. 5 are pens of one dimension, respectively. The tables themselves are constituted in two dimensions. For convenience of illustration, however, three tables are overlapped in one dimension. Thin lines in the diagrams indicate values obtained by linear interpolation from the values of thick lines. As for the table for the lowest pressure w, the same table may be used for similar pens rather than providing a low pressure table for each pen, since the influence of input is small.

Figure 6:
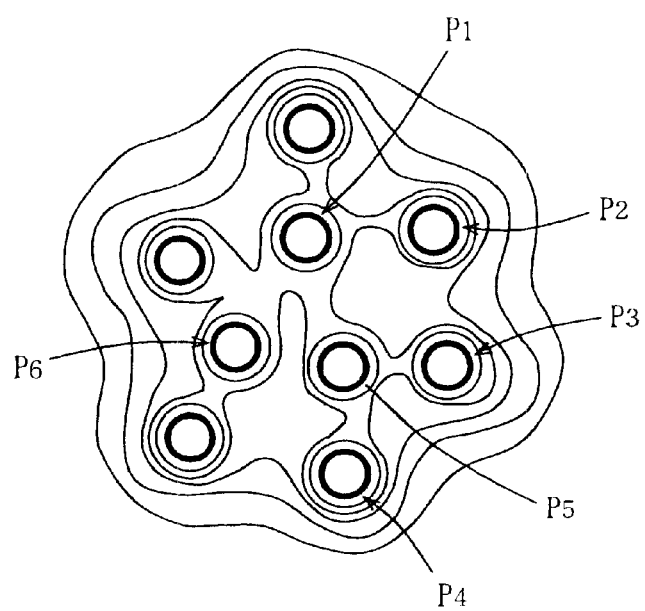
FIG. 6 is a diagram showing an example of a two-dimensional pen table for a medium pressure used in the embodiment.
Figure 7:
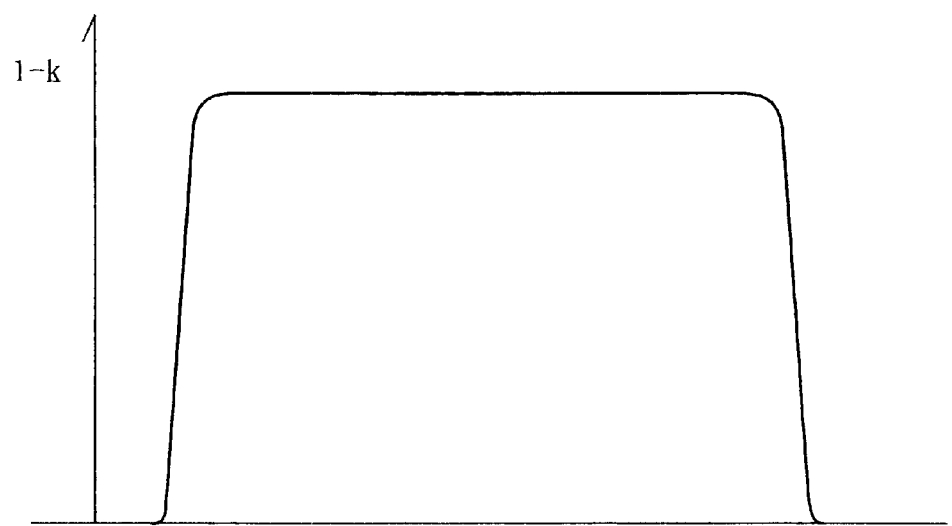
FIG. 7 is a diagram showing an example of a two-dimensional pen table for a high pressure used in the embodiment.
Figure 8:
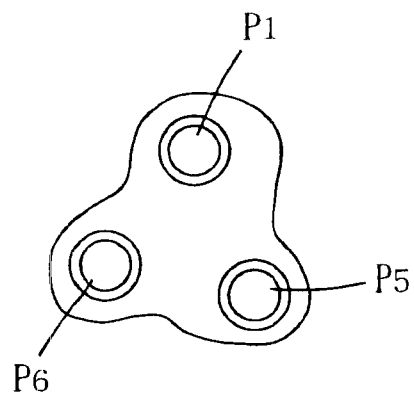
FIG. 8 is a diagram showing an example of a two-dimensional pen table for a low pressure used in the embodiment.

FIG. 6, FIG. 7 and FIG. 8 are examples of two-dimensional tables with texture. FIG. 6 is a table for a medium pressure and has a feature that it has peaks P1~P6. When a high pressure is exerted to this pen, input densities are saturated as shown in FIG. 7, and its texture disappears. When a low pressure is exerted to the pen, as shown in FIG. 8, peaks P1, P5 and P6 remain. The addresses within the table (addresses within the patch) of these peaks are common to those of the peaks P1, P5 and P6 of FIG. 6, and other peaks disappear. When such a pen is used, the texture as well as the stroke width and the density will change with the pressure, affording better expression.

Figure 9:
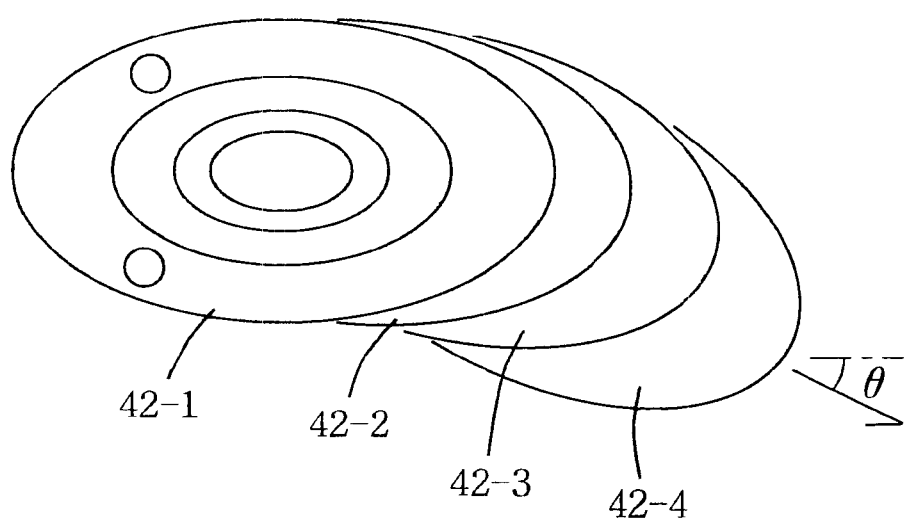
FIG. 9 is a diagram showing an example of a two-dimensional pen locus in the embodiment.

FIG. 9 shows an example of a pen having a directionality. It changes the direction in the order of from patch 42-1 to patch 42-4. For example, assume the latest patch 42-4 forms an angle θ with the horizontal direction. Then the interpolator will rotate the relevant tables by the angle θ and read out data. As a result, the texture of this pen shifts the direction as the stylus 4 shifts its direction.

Figure 10:
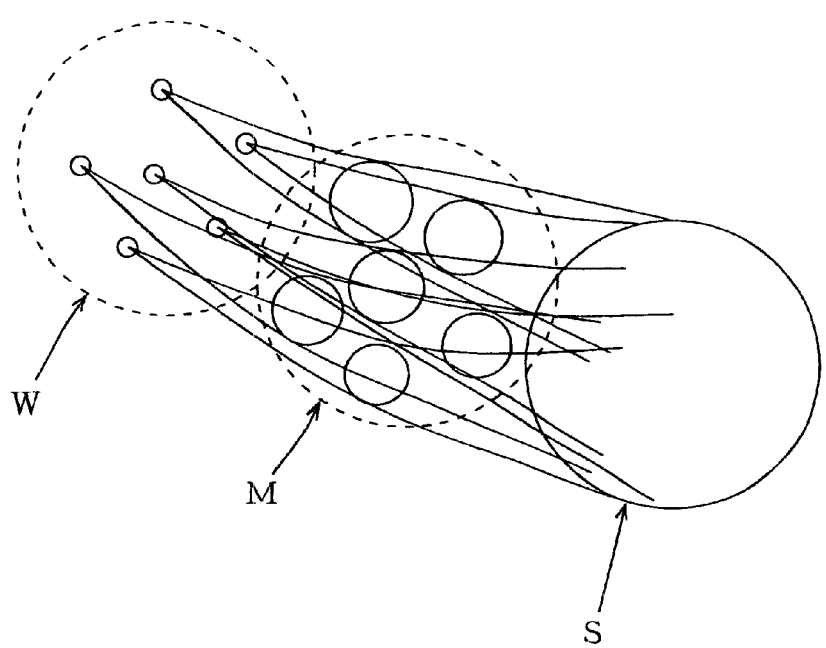
FIG. 10 is a diagram showing an example of a pen used in the embodiment.

FIG. 10 shows three pen tables used for drawing with pressures ranging from a low pressure to a high pressure. This pen has six small peaks in the low pressure part in the left of the diagram. Around these peaks, stylus densities are zero. In the medium pressure part, the respective peaks have grown in size and the stylus densities are not zero between peaks. In the high pressure part, the respective peaks are merged to form a disk of the highest stylus density. Pen tables are provided for respective low pressure, medium pressure and high pressure and are interpolated according to the pressure.

Figure 11:
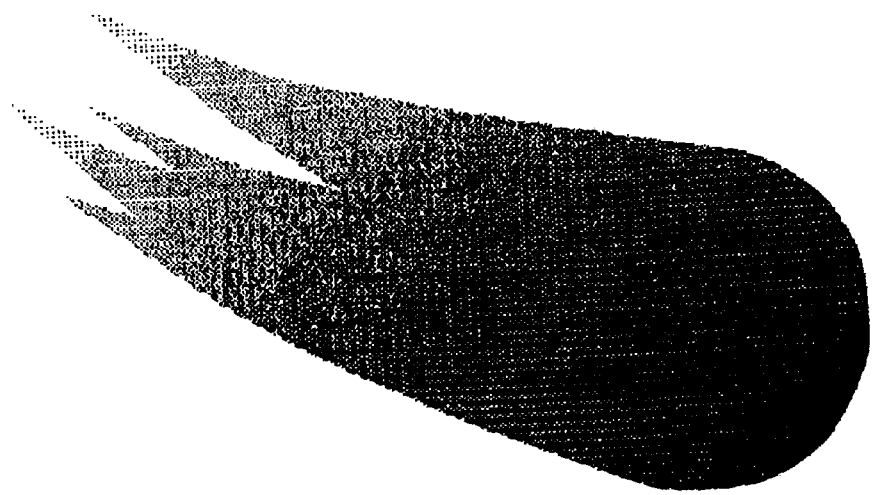
FIG. 11 is a diagram showing a result of drawing using the pen of FIG. 10.

A resultant image from the process in FIG. 10 is shown in FIG. 11. At the first part of the stroke, peaks of the low pressure part appear as dots. With the increase in the stylus pressure, the widths of the respective peaks increase and the peaks merge with each other. At the last part of the stroke, a circular part drawn at the highest density is conspicuous. Thus with the present embodiment, one can draw with pens that have their independent characters.

In the embodiment, as pen densities are generated by linear interpolation of tables, the process is executed at high speed. As tables are switched according to the pressure, the stylus pressure is reflected in the stroke width, density and texture. As the stylus pressure is used for the interpolation of tables, the required number of pen tables for storing data can be small. Moreover, as sub-pixel process can be done, inputs of improved expression can be made. As pen tables of two dimensions are moved according to the movement of the stylus, a realistic image can be drawn, of which texture is continuous along a curve.

What is claimed is:

1. An image processing device having a memory for storing an image, a monitor for displaying said stored image, a drawing input means for inputting an input location and pressure applied, and a table provided for each type of virtual pens, storing an input signal distribution for a single touch of said drawing input means, wherein a plurality of touches of said drawing input means form a stroke, wherein said input signal distribution overlaps between said touches, said image processing device comprising:
plural tables for each of said pens, wherein each of said tables is a two-dimensional table; and
rotating means for rotating each table according to a direction of travel of said drawing input location,
wherein said input signal distribution is generated according to said pressure by interpolating said tables.

2. An image processing device of claim 1 characterized in that
at least two tables, one for a high pressure and one for a medium pressure, are provided for each of said pens, and at least a table for a low pressure is provided,
said pressure being equal to or greater than the medium pressure, said distribution is determined by linear interpolation of the high pressure table and the medium pressure table, and
said pressure being equal to or lower than the medium pressure, said distribution is determined by linear interpolation of the medium pressure table and the low pressure table.

3. An image processing device of claim 1 characterized in that
a resolution of said input location and a resolution of at least some of tables are higher than a resolution of said stored image, and
the read-out addresses of the tables are arranged to be determined according to a surplus of the resolution of the input location over a resolution of the stored image.

4. An image processing device of claim 1 characterized in that a distribution of input signals with a texture is stored in at least some of said tables.

5. An image processing device of claim 4 characterized in that
for at least a part of pens, a low pressure table and a medium pressure table, each storing an input signal distribution having plural peaks and a texture, are provided, and
that at least some of said plural peaks of said low pressure table and at least some of said plural peaks of said medium pressure table are arranged to be continuous in their locations in the tables.

* * * * *